(12) United States Patent
Reime

(10) Patent No.: US 8,405,821 B2
(45) Date of Patent: Mar. 26, 2013

(54) METHOD AND DEVICE FOR DETERMINING THE DISTANCE TO A RETROREFLECTIVE OBJECT

(76) Inventor: Gerd Reime, Buhl (DE)

( * ) Notice: Subject to any disclaimer, the term of this patent is extended or adjusted under 35 U.S.C. 154(b) by 317 days.

(21) Appl. No.: 12/524,904

(22) PCT Filed: Jan. 28, 2008

(86) PCT No.: PCT/EP2008/000615
§ 371 (c)(1),
(2), (4) Date: Mar. 19, 2010

(87) PCT Pub. No.: WO2008/092611
PCT Pub. Date: Aug. 7, 2008

(65) Prior Publication Data
US 2010/0182588 A1 Jul. 22, 2010

(30) Foreign Application Priority Data
Jan. 29, 2007 (DE) .......................... 10 2007 005 187

(51) Int. Cl.
*G01C 3/08* (2006.01)
(52) U.S. Cl. ...................................... 356/5.1
(58) Field of Classification Search ................ 356/5.01; 702/79, 149; 250/269.8, 287
See application file for complete search history.

(56) References Cited

U.S. PATENT DOCUMENTS

| | | | |
|---|---|---|---|
| 4,523,093 A * | 6/1985 | Neumann | 250/234 |
| 4,788,441 A * | 11/1988 | Laskowski | 250/559.38 |
| 6,043,874 A * | 3/2000 | Detweiler | 356/139.03 |
| 6,055,490 A * | 4/2000 | Dunne | 702/159 |
| 6,212,480 B1 * | 4/2001 | Dunne | 702/159 |
| 6,252,655 B1 * | 6/2001 | Tanaka | 356/5.06 |
| 6,393,377 B1 * | 5/2002 | Shirai et al. | 702/159 |
| 6,711,280 B2 * | 3/2004 | Stafsudd et al. | 382/106 |
| 7,202,941 B2 * | 4/2007 | Munro | 356/5.01 |
| 7,375,593 B2 * | 5/2008 | Self | 331/16 |
| 7,513,160 B2 * | 4/2009 | Lynch et al. | 73/602 |
| 7,782,256 B2 * | 8/2010 | Smith | 342/453 |

FOREIGN PATENT DOCUMENTS

| | | |
|---|---|---|
| DE | 198 30 684 | 3/2000 |
| DE | 100 22 054 | 11/2001 |
| DE | 103 00 223 | 6/2004 |
| DE | 10 2005 045 993 | 2/2007 |
| WO | 2005/054902 | 6/2005 |
| WO | 2007/012501 | 2/2007 |

OTHER PUBLICATIONS

International Search Report; PCT/EP2008/000615; Jun. 23, 2008.

\* cited by examiner

*Primary Examiner* — Luke Ratcliffe
(74) *Attorney, Agent, or Firm* — Cantor Colburn LLP

(57) ABSTRACT

The invention relates to a method and a device for determining a modification at one object or a modification caused by an object (1.26), wherein a measurement of the light propagation time is also possible. According to the invention, an amplitude control (1.6) regulates a transmitter light source (1.8) and a reference light source (1.9) on the basis of a control value (1.29) in such a way that the signals from the corresponding associated light paths have approximatively the same value at the input of a comparator (1.19). As a result, an alternative detection of extraneous light is possible. In addition, a phase regulation for measuring the light propagation time can be provided.

25 Claims, 5 Drawing Sheets

METHOD AND DEVICE FOR DETERMINING THE DISTANCE TO A RETROREFLECTIVE OBJECT

RELATIONSHIP TO RELATED APPLICATIONS

The present application claims the priority of the German Patent Application 10 2007 005 187.7, filed on Jan. 29, 2007, the disclosure of which is also expressly incorporated herewith into the present application.

FIELD OF THE INVENTION

The invention relates to a method and a device for determining the distance to a retroreflective object and also the reflection factor of the object.

BACKGROUND OF THE INVENTION

There is a desire in many fields to measure or recognise changes at an object such as in the distance to an object, for example, in order to derive control commands therefrom for any desired arrangements. Thus, a door opens when a measurement arrangement detects the approach of an object. Or a revolving door stops as soon as an obstacle is detected. Changes can occur as a result of the approach, the presence or removal of an object and are detected by the measuring device.

One possibility of distance measurement lies in the use of the light transit time. In this case, a laser beam is directed onto the object to be measured and the reflected light is measured. The delay until the reflected light arrives at the receiver again is a value for the distance that the light has covered. The speed of light amounts to about 300 000 km/s. A light pulse covering a path of 3 m needs approximately 10 nanoseconds to do so. High-speed lasers respectively high-speed photodiodes and amplifiers are necessary to determine the light transit time in a meaningful manner in the case of such short light paths.

One solution uses the possibility of transforming the transit time information into a frequency range that is easier to handle (cf. e.g. DE 100 22 054 A1). For this, to determine the transit time the emitted light is modulated with a high frequency, e.g. some hundreds of MHz. The received light is then mixed with a second frequency, which differs only slightly from the transmitted frequency. A third, significantly lower frequency that can be processed in a circuit more easily than the original high modulation frequency is formed as a mixed product. In this third frequency the information of the light transit time lies in the phase. Since the third frequency is generally mixed into a frequency range of some KHz, the determination of the phase information, and therefore the light transit time, is very simple. The determined difference value is used to actuate a phase shifter configured as a digital delay element and the delay time is changed until the difference value is low. The disadvantage of this system is that only a specific distance range is covered, outside of which the phase information is repeated periodically, so that uncertainties occur. Extensive measures such as the modulation with different frequencies, for example, are necessary to avoid these uncertainties. This system operates on principle with more than one light pulse, since otherwise no mixing process can occur. In known systems at least some thousands of individual pulses are emitted to obtain a plurality of periods of the signal mixed to the third frequency.

A second method of determining the light transit time is the direct measurement of an individual pulse. Uncertainties that are a disadvantage in the above-described method are excluded because of this. The advantage of an individual pulse is the possible higher power. However, significantly higher requirements are also set for the detection of such a light pulse in the receiver. To measure distances of less than 15 cm, the receiver must have a reaction time of less than a nanosecond. However, a perfectly emitted light pulse with a rise time of theoretically zero is "blurred" by the naturally limited bandwidth of the receiver. In an evaluation with a threshold value of 50% of the maximum amplitude, for example, a "delay" thus occurs that is generally dependent on temperature, but also on the received energy.

In practice, reflection differences of e.g. 1:30 000 occur between highly reflective surfaces, e.g. mirrors, and highly light-absorbent surfaces, e.g. black suede. To nevertheless generate a usable measured value, the received signal is generally regulated to a fixed amplitude. This regulation of the amplitude can lead to an undesirable time lag. The determination of the exact instant of receipt in the case of very small signals, and therefore a high noise component, has also proved difficult. Moreover, in the case of high reflection the received pulse should not overload the photodiode or preamplifier, since the instances of non-linearity occurring in that case have a negative effect on the accuracy of the receipt time.

Furthermore, a high-speed photodiode, generally an avalanche photodiode, is necessary for this method just as for the first-described method. Moreover, if the received signal is not already mixed with the second frequency in the photodiode, as in the first-described method, a high-speed preamplifier must also be provided here. Frequency ranges into the gigahertz range are no rarity. An additional factor is also a possible influence of extraneous light, which in an extreme case is some thousands of times stronger than the reflected light of the emitted pulse. All these influences have a negative effect on the accuracy of the measurement.

A light transit time measurement system is known from the later published patent application DE 10 2005 045 993.5, in which the light coming from continuously alternately clocked light paths is adjusted to a value of equal magnitude in the receiver by an amplitude regulation, and in this stabilised state the received signals are continuously checked for clock pulse change signals at the transitions between the clock pulses. These clock pulse change signals are then regulated to zero by shifting the phase preferably of both light paths in contrary direction to one another, wherein the adjusted phase shift corresponds to the light transit time to and from an object and thus to the distance to the object. With this solution the clock-synchronous signal component in the receiving path becomes zero with ideal switching behaviour of the light sources and correct phase shift control. This means that only amplifier noise is possibly present at the output of the photodiode amplifier. The method works exclusively with continuously consecutive pulses alternately coming from two different, but electrically identical light sources and is therefore restricted in its pulse power because of the temperature limit in the light-emitting diodes used. There is no electrical signal present that is integrated over at least one sub-section of the transmitted signal or reference signal resulting from these signals that are, moreover, close in time.

However, a disadvantage with this method is the possible occurrence of a signal that is not adjustable exactly to zero resulting, for example, from an asymmetry of the light sources or other electronic components used. This residual signal can lead to a measurement error in the case of high incident extraneous light radiation and at the same time high reflection of the transmitted signal. Said asymmetry occurs, for example, when an LED behaves differently with respect to time during switching on and off or when different light sources, e.g. lasers and LEDs, are used in combination.

BRIEF DESCRIPTION OF THE INVENTION

The present invention provides a method that works with individual pulses of high energy density.

All, or at least many, of the abovementioned disadvantages can preferably be avoided. A simpler solution for measuring distances working from zero distance even under extreme temperature and extraneous light influences is thus provided. Instances of non-linearity of photodiode or preamplifier have no influence on the measurement accuracy. At the same time, there is the possibility of using components with a low bandwidth. Thus, instead of the costly and small-area avalanche photodiodes usually used, an inexpensive large-area photodiode, e.g. the BPW 34 photodiode from Osram, can be used.

The invention makes use of the principle that instead of measuring and evaluating a reflected pulse, a possible pulse in the receiver is caused to disappear. For this, the received pulse is preferably "embedded" between two reference pulses that likewise originate from a light path, or is transmitted electrically so that it is no longer recognisable as an individual pulse. However, the comparison with a reference pulse also suffices. The influence of the starting time, which causes the light pulse to "disappear", then corresponds to the transit time of the light pulse from the transmitting light source to the reflecting object and back again to the receiver, and thus constitutes a value for the distance.

If required, the pulses can also be detected before and after the actual transmitted signal and a mean value can be formed from their amplitudes that corresponds to the component of the reference signal and on that basis is compared with the amplitude value from the light signal.

It has been shown in practice that the clock pulse change signals alone may still contain an error potential because rise and decay times of the light-emitting diodes are included.

However, if a clock pulse change signal is used alone and is compared to an amplitude value that is independent of the light transit time, these errors can be reduced even though a possible temperature drift can then have a slightly greater influence. The amplitude value regulated by the amplitude regulation at the preamplifier is preferably used as a reference for this. Thus, if a clock pulse change signal is adjusted or eliminated so that it corresponds to this reference value, this may be equated with a levelling of the two clock pulse change signals to the same magnitude because of the clock-synchronous occurrence of the clock pulse change signals. Alternatively or additionally, a residual error can be completely removed by a further regulation.

Inexpensive LEDs with a significantly lower rise time compared to the laser diodes usually used can be used as transmitters without the measurement accuracy suffering as a result. Similarly, no "high-speed" electronic system is required. With an integration of the electronic system this can occur solely by using the relatively slow CMOS technology.

In the components, in particular the light-emitting diodes, any instances of asymmetry or tolerances that may occur are regulated out and have no influence on the measurement accuracy, even under a high influence of extraneous light.

Further advantages are evident from the sub-claims and the following description.

BRIEF DESCRIPTION OF THE FIGURES

The invention shall be explained in more detail below on the basis of the attached figures.

DETAILED DESCRIPTION OF THE PREFERRED EMBODIMENTS

Figure 1:
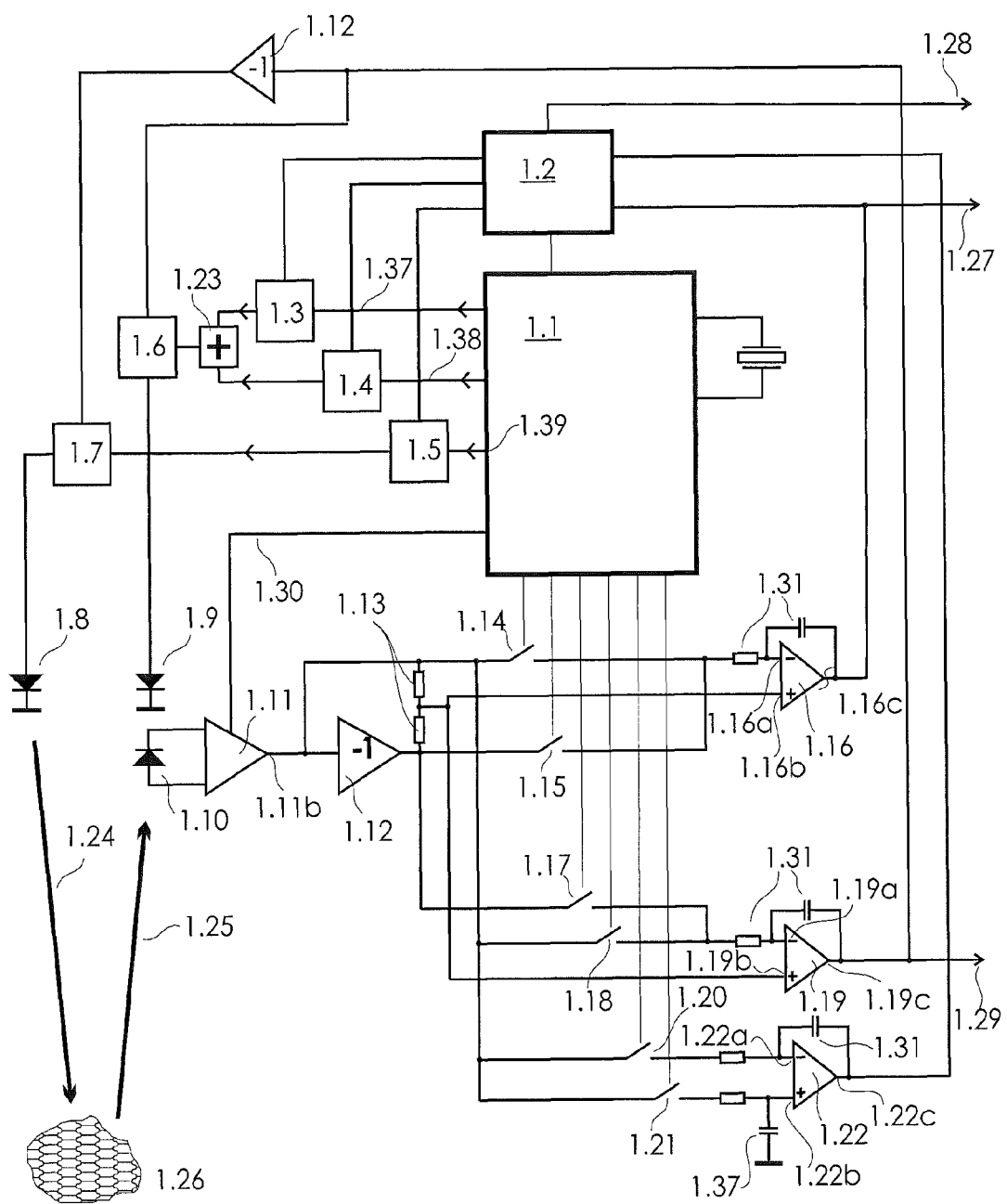
FIG. 1 is a schematic representation of a circuit diagram of the measurement arrangement.

The invention is now explained in more detail in an exemplary manner with reference to the attached drawings. However, the exemplary embodiments only represent examples that are not intended to restrict the inventive concept to a specific arrangement. Before the invention is described in detail it should be noted that it is not restricted to the respective components of the device and the respective method steps, since these components and methods can vary. The terms used here are only intended to describe particular embodiments and are not used to be restrictive. Moreover, when the singular or indefinite article is used in the description or in the claims, this also relates to the plural of these elements, unless the overall context clearly indicates something different.

A clock control 1.1, e.g. an appropriately programmed microcontroller, delivers pulses to at least one transmitting light source 1.8 and a second light source 1.9 located in direct proximity to the receiver that serves as a reference light source. The light sources can be light-emitting diodes or laser diodes or a selective combination of both types. At least one of the two light sources is adjustable in its phase and amplitude by a determinable amount. The transmitting light source 1.8 emits a pulse of 100 ns every 10 ms, for example. This passes through the light path 1.24 and 1.25 to the object and from the object 1.26 to a receiver such as e.g. the photodiode 1.10 and without further measures would appear as an individual pulse in the amplifier 1.11. The above mentioned problems would now occur in the prior art for detection of the instant of arrival.

Figure 2:
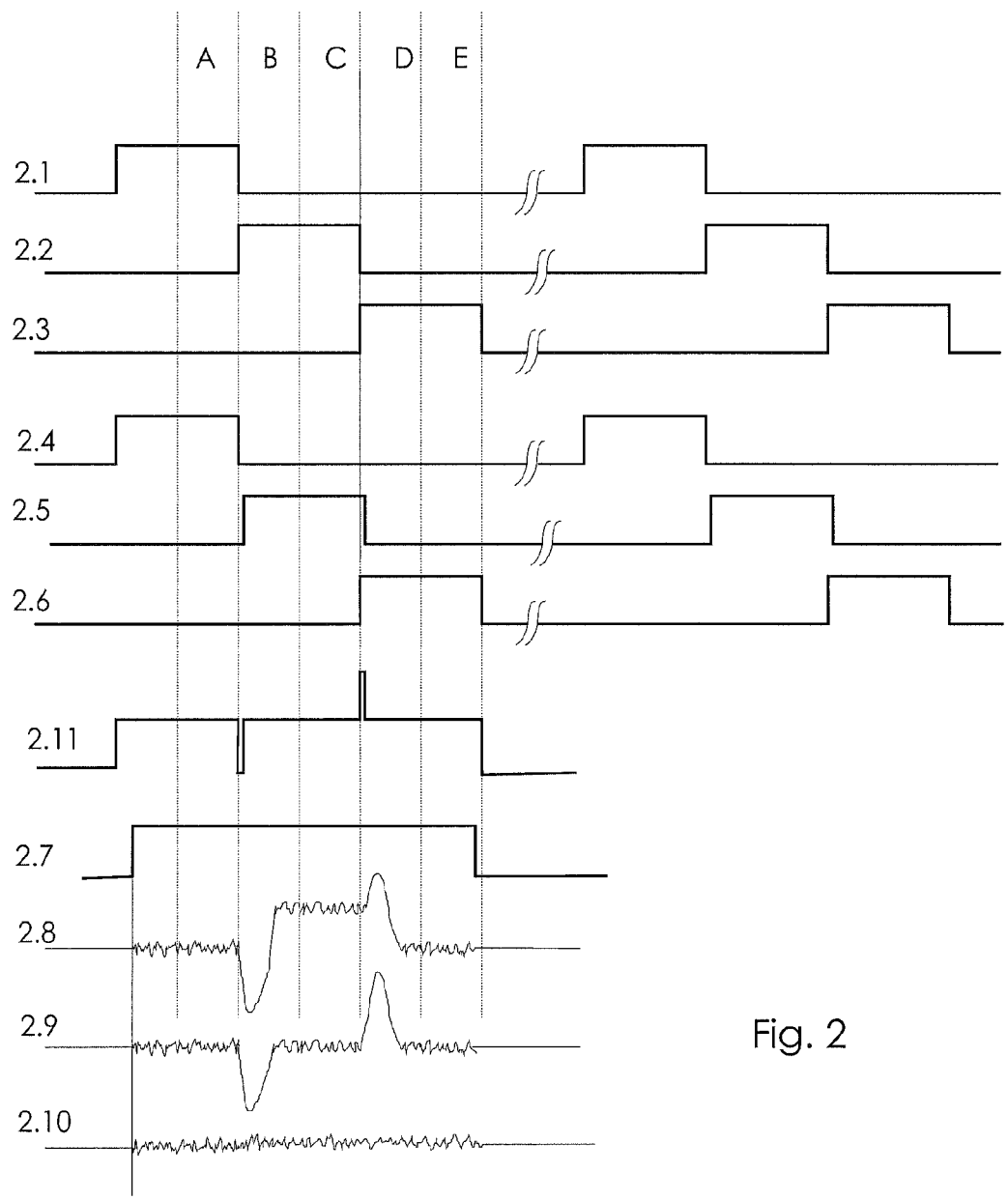
FIG. 2 shows signal courses in relation to time.

For this reason, in the invention a reference pulse 2.1 is firstly emitted according to FIG. 2. This is conducted from the second light source 1.9 directly over a short path into the photodiode 1.10. After the end of the reference pulse 2.1, the actual transmitted pulse 2.2 (FIG. 2) of the transmitting light source 1.8 firstly follows closely. A further reference pulse 2.3 emitted by the second light source 1.9 preferably follows closely after the end of the transmitted pulse 2.2. The transmitted pulse 2.2 is thus embedded between two reference pulses. However, the described method also works with only one reference pulse, or the references pulses can also be forwarded directly as electrical reference signals to the preamplifier 1.10 or the subsequent regulating means. However, quickly changing extraneous light influences can then lead to momentary measured value errors.

The light of the transmitting light source 1.8 and the light of the reference light source 1.9 firstly arrive at the photodiode 1.10 with different intensity. This means that the transmitted pulse 2.2 is either larger (received signal 2.8 in FIG. 2 with non-regulated phase and amplitude) or smaller than the reference pulses. At the same time, a time lag occurs as a result of the longer distance over the light paths 1.24 and 1.25 to and from the reflecting object 1.26. Moreover, the receiver converts the received signal, i.e. the received transmitted signal 2.2, and possibly the at least one received reference signal 2.1, 2.3 respectively into an electrical transmitted signal 2.5 or an electrical reference signal 2.4, 2.6. The electrical reference signal can alternatively also be brought into the circuit and the following regulation means directly without being diverted via a light path.

The photodiode amplifier, the preamplifier 1.11, is firstly actively connected during the time period of all the pulses by means of the control line 1.30. As a result of this measure only the time range, in which the light sources are active, is considered. Falsifications of the received signal as a result of the light rise in the case of the first reference pulse 2.1 and the light decay at the end of the second reference pulse 2.3 are excluded as a result of this.

A breakdown of the received signal according to FIG. 2 into clock pulse sections A,B,C,D,E shows, on the one hand, two regions B, D with clock pulse change signals between adjacent pulses 2.1, 2.2 or 2.2, 2.3 and, on the other hand, the regions A, C, E, in which the clock pulse change signal has decayed and only pure amplitude information remains.

The amplitude differences in the regions A, E are now firstly compared with the region C with the signal path switches 1.17 and 1.18. For this, the signal path switch 1.17 switches region A, E to a first input 1.19*a* of a comparator 1.19. Region C is inverted to regions A+E by means of inverter 1.12 and passed with signal path switch 1.18 to the same input 1.19*a* of the comparator 1.19. The second input 1.19*b* of the comparator 1.19 connects to a means formed by two identical resistors 1.13 for forming the mean value from the direct and the inverted signal of the preamplifier 1.11. Since the two signals of equal magnitude cancel one another out with respect to alternating voltage, a pure direct voltage component occurs at the sum point between the two resistors. Only a direct voltage drift of the output voltage from the preamplifier 1.11 and the inverter 1.12 is communicated to the sum point and therefore to the second input 1.19*b* of the comparator. The influence of a temperature-based direct voltage drift of the amplifier 1.11 and the inverter 1.12 is offset in the comparator 1.19 as a result of this measure. The comparator 1.19 can itself be configured as high-amplification operational amplifier with integration 1.31 of the input signal.

The purpose of this comparator 1.19 is to detect such a small difference of the input values and provide it as control value 1.29 at the output 1.19*c*. This control value can be evaluated for the detection of changes at or as a consequence of the object and therefore serves, for example, to detect the position, location and movement of the object 1.26.

The connections 1.31 of the comparators 1.16, 1.19 and 1.22 correspond to an integrating "sample and hold" function. For comparator 1.19, for example, this means that the mean value of the signal scanned with the signal path switch 1.17 or 1.18 is stored until the next clock cycle.

Thus, the amplitude values of the reference pulses 2.1 and 2.3 are compared with the amplitude values of the transmitted pulse 2.2 in the comparator 1.19. A difference between the two values leads to a control voltage 1.29 at the output 1.19*c* of the comparator 1.19. At least one of the two light sources 1.8 and 1.9 is readjusted in its amplitude with this control voltage until no or at least only a minimal difference in the input voltages is present at the comparator 1.19. In the exemplary embodiment, the reference light source 1.9 is regulated directly by means of the amplitude regulation 1.6, whereas the transmitting light source 1.8 is regulated inversely by means of the amplitude regulation 1.7 and the inverter 1.12.

In the case of weak reflection at the object 1.26, the transmission stage is regulated to high power, for example, whereas the reference light source 1.9 is adjusted down until the reference pulses 2.1, 2.3 appear in the receiver 1.10 to be equal in magnitude to the transmitted pulse 2.2. If we leave the time lag resulting from the light paths 1.24 and 1.25 out of consideration, the total transmitted pulse is not visible as such in the received signal consisting of the first reference signal 2.1, the transmitted signal 2.2 and the second reference signal 2.3. It has "disappeared", as it were.

While as a result of this measure the transmitted pulse is so embedded in a second signal environment that it is no longer visible, the time that this pulse has covered on the light paths 1.24 and 1.25 should be determined in the case of a light transit time measurement. Assuming that the light path 1.24 is 15 cm long and therefore the return distance is 30 cm, in the case of a pulse transit time of 300 000 km/s, in round figures, the pulse needs one nanosecond. The pulse arrives in the receiver with a "delay" of one nanosecond.

This state is shown in the representation in FIG. 2 of the received signal 2.4 of the first reference pulse 2.1, the received signal 2.5 of the transmitted pulse 2.2 arriving delayed by one nanosecond and the received signal 2.6 of the second reference pulse 2.3. The delay is represented in the drawing as excessive, but in practice a delay of 1 nanosecond is barely visible in relation to the transmitted pulse length. However, between the received signal 2.4 of the first reference pulse 2.1 and the received signal 2.5 of the incoming transmitted pulse 2.2 a short gap of one nanosecond will occur, in which no light from one of the two light sources 1.8 and 1.9 will enter the photodiode 1.10. Analogously hereto, there will be an overlap of both pulses of one nanosecond at the transition of the received signal 2.5 of the transmitted pulse 2.2 to the received signal 2.6 of the reference pulses 2.3. This means: in the received signal a short negative pulse of one nanosecond appears at the transition between the first reference pulse 2.1 and the transmitted pulse 2.2 and an equally long positive pulse appears at the transition of the transmitted pulse 2.2 to the second reference pulse 2.3.

A "slow" photodiode and a "slow" preamplifier are no longer able to resolve this short pulse. Since, additionally, the rise times in commercially available light-emitting diodes and driver stages in CMOS technology are certainly longer than one nanosecond, in the best case there would appear at the output of the preamplifier 1.11 a greatly blurred pulse, the amplitude of which can be poorly determined.

However, if the transit time of the light signal is determined according to the method described here, an accurate measurement of the received light pulse is no longer mandatory. Instead, it is even an advantage if the received pulse is "blurred" by a limitation of the photodiode or preamplifier bandwidth. The energy of the pulse is not lost during the blurring, i.e. during passage through an amplifier with a reduced bandwidth. Then, from a pulse of one nanosecond and a pulse height of 10 mV, for example, there results a pulse height of 10 microvolts, but with a length of 1000 nanoseconds. This "small" but long pulse can now be amplified without problem using CMOS technology. With an amplification of 80 dB, a pulse height of 100 mV then results. The photodiode amplifier 1.11 can also be configured as a high-amplification limiting amplifier. While the temporally precise allocation of the receiver pulse 2.5 is lost, it is not in fact needed in the method described here.

The signal 2.9 in FIG. 2 shows the received signal regulated in amplitude, but not yet in time at the output of the preamplifier 1.11. From the very short pulses at the transition between the transmitted and reference pulses a long and easily processed pulse has now resulted. In a further step the received signal 2.9 is now checked for these pulses. For this, the amplitude differences in the regions B and D are compared with the signal path switch 1.14 and 1.15. The signal path switch 1.14 switches to a first input 1.16a of a comparator 1.16 during region B. Region D is inverted to region B with signal path switch 1.15 and passed onto the same input 1.16a of the comparator 1.16.

The second input 1.16b of the comparator 1.16 connects to a means formed by two identical resistors 1.13 for forming a mean value from the direct and the inverted signal of the preamplifier 1.11. Since the two signals of equal magnitude cancel one another out with respect to alternating voltage, a pure direct voltage is present at the sum point between the two resistors. Only a direct voltage drift of the output voltage of the preamplifier 1.11 and inverter stage 1.12 is communicated to the sum point and therefore the second input 1.16b of the comparator 1.16. The influence of a temperature-based direct voltage drift of the amplifier 1.11 and the inverter 1.12 is offset in the comparator 1.16 by this measure. The comparator can be identical in configuration to comparator 1.19, i.e. a high-amplification operational amplifier with integration of the input signal. The configuration of the comparators described here can also be of a different type, it is only essential that they compare two signals with one another and have a high amplification in so doing. A difference between the two input values of the comparator 1.16 leads to a control voltage 1.27 at the output of the comparator 1.16.

In the exemplary embodiment the data from sections B and D are compared directly with one another, as is also shown in FIG. 1. However, it has been shown in practice that properties of the light-emitting diodes can falsify the result. A possibility of reducing this influence is to eliminate or minimise the amplitude of only one clock pulse change signal in relation to the amplitude of a reference value present at the output 1.11b of the preamplifier 1.19 in the stabilised state of the amplitude regulation.

The control voltage 1.27 is passed to a control voltage processing means 1.2. In dependence on the control voltage 1.27, this stage shifts the phases of the reference pulses 2.1, 2.3 and the transmitted pulse 2.2 in relation to one another by means of the analog or digital phase shift controls 1.3, 1.4, 1.5 so that the pulses present at the preamplifier 1.11 disappear in the time sections B and D.

It is sufficient if only the transmitted pulse 2.2 or also only the reference pulses 2.1 and/or 2.3 are shifted in time, but transmitted and reference pulses can naturally also be shifted in relation to one another. In the described example of a distance of the reflecting object 1.26 of 15 cm away, the reference pulses and the transmitted pulse must be shifted by exactly one nanosecond in relation to one another. The clock change pulses of the transmitted signal 2.9 are then eliminated according to signal 2.10 and only the amplifier noise without any clock-synchronous components is now still present at the output 1.11b of the amplifier 1.11. In the addition stage 1.23, the first and the second reference pulse are combined and passed to the amplitude regulation 1.16.

The information of the light transit time is then contained in the control voltage 1.27. However, the value of the light transit time can also be obtained as a digital value.

A determination of the light transit time using the method described thus far has the advantage of a very high detection sensitivity with a very high dynamic range of reflection. If need be, the described method also works with only one reference pulse. However, quickly changing extraneous light influences can then lead to momentary measured value errors.

Figure 4:
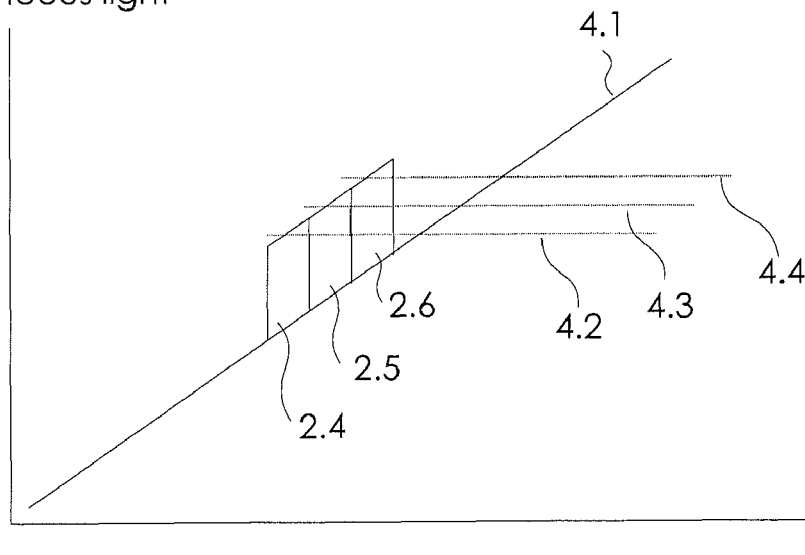
FIG. 4 shows a signal influenced by extraneous light.

FIG. 4 shows the advantage of two reference pulses. In the case of a quick rise of the extraneous light component 4.1, the received signals 2.4, 2.6 of the reference pulses and the received signal 2.5 of the transmitted pulse are also influenced. Since the mean value 4.2 for the first reference pulse, the mean value 4.3 for the transmitted pulse and the mean value 4.4 for the second reference pulse are formed in the integration circuit 1.31, the resulting joint mean value of the reference pulses 2.4 and 2.6 equals the mean value 4.3 of the transmitted pulse. Therefore, quick extraneous light changes do not have an influence on the measurement.

Other pulse sequences than those represented in the exemplary embodiment can naturally also be used. Thus, only the one reference pulse, for example, can also be embedded between two transmitted pulses.

Figure 3:
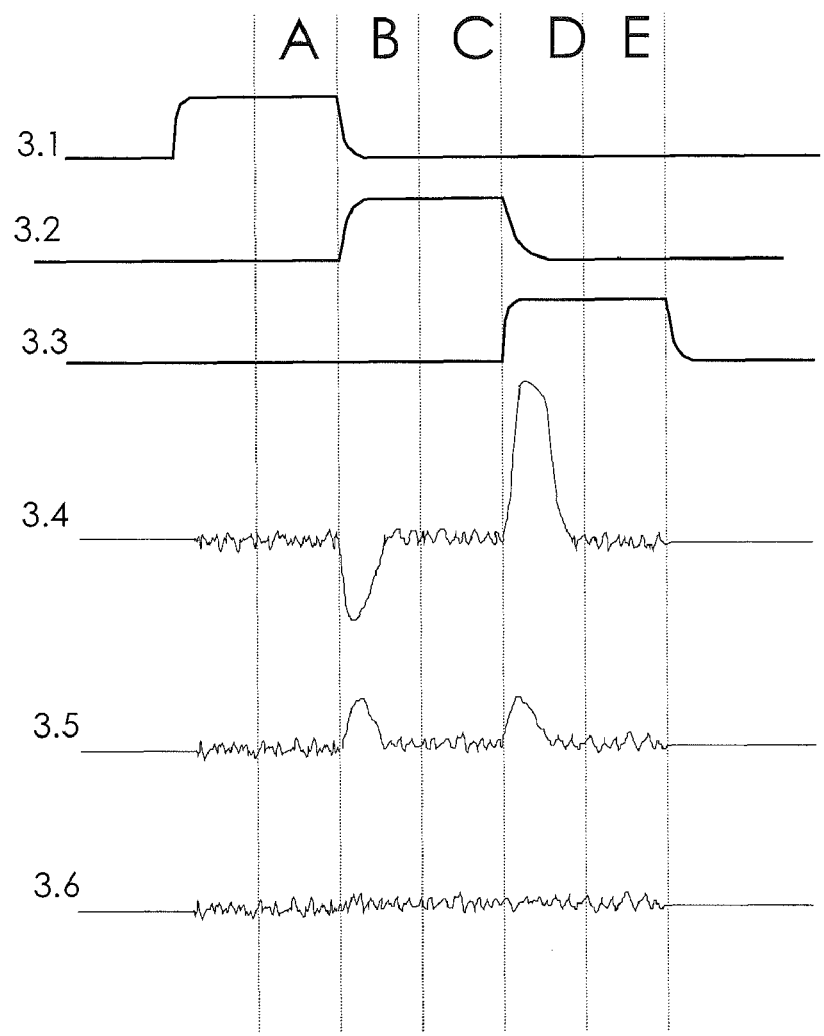
FIG. 3 shows signal courses in relation to time in the case of different light sources as transmitting light source and as reference light source.

When using light sources with different reaction times, the received signal cannot be precisely eliminated in the time sections B and D. This difference in the rise and decay times occurs, for example, in the case of light-emitting diodes of different charges or when using a laser diode as transmitter and an LED as reference light source for reasons of cost. FIG. 3 represents this state in the signals 3.1, 3.2 and 3.3. The output signal 3.4 of the preamplifier 1.11 shows an asymmetric course without time correction of the reference or the transmitted pulse. While the desired symmetry results after levelling by means of comparator 1.16, a residual error remains in the clock pulse regions B and D.

With strong reflection (retroreflector in direct proximity of the sensor) and a strong extraneous light influence (sunlight with 100 klx directly into photodiode), measurement errors can occur because of the then resulting instances of non-linearity in the photodiode and the not fully eliminated signal. To prevent this, clock pulse sections A, C and E are compared with clock pulse sections B and D by means of a further comparator 1.22. For this, the signal path switch 1.20 switches clock pulse sections A, C, E to an input 1.22a of the comparator 1.22, whereas the signal path switch 1.21 switches clock pulse sections B, D to the other input 1.22b. The output 1.22c of the comparator 1.22 is connected to the control voltage processing means 1.2.

If the comparator 1.22 detects a difference in the clock pulse sections A, C, E in relation to B, D, then the control voltage processing means 1.2 acts on the phase shift control so that the transmitted pulse, for example, is lengthened or shortened until the residual error 3.5 is completely eliminated and once again only the amplifier noise without clock-synchronous components is present at the photodiode amplifier 1.11. In this case, it is immaterial whether the length of the transmitted pulse or the reference pulses is influenced in relation to time or the reference pulses are shifted in position. All three adjustments, i.e. amplitude, time lag and compensation of the reaction time, can be active simultaneously without interfering with one another.

Figure 5:
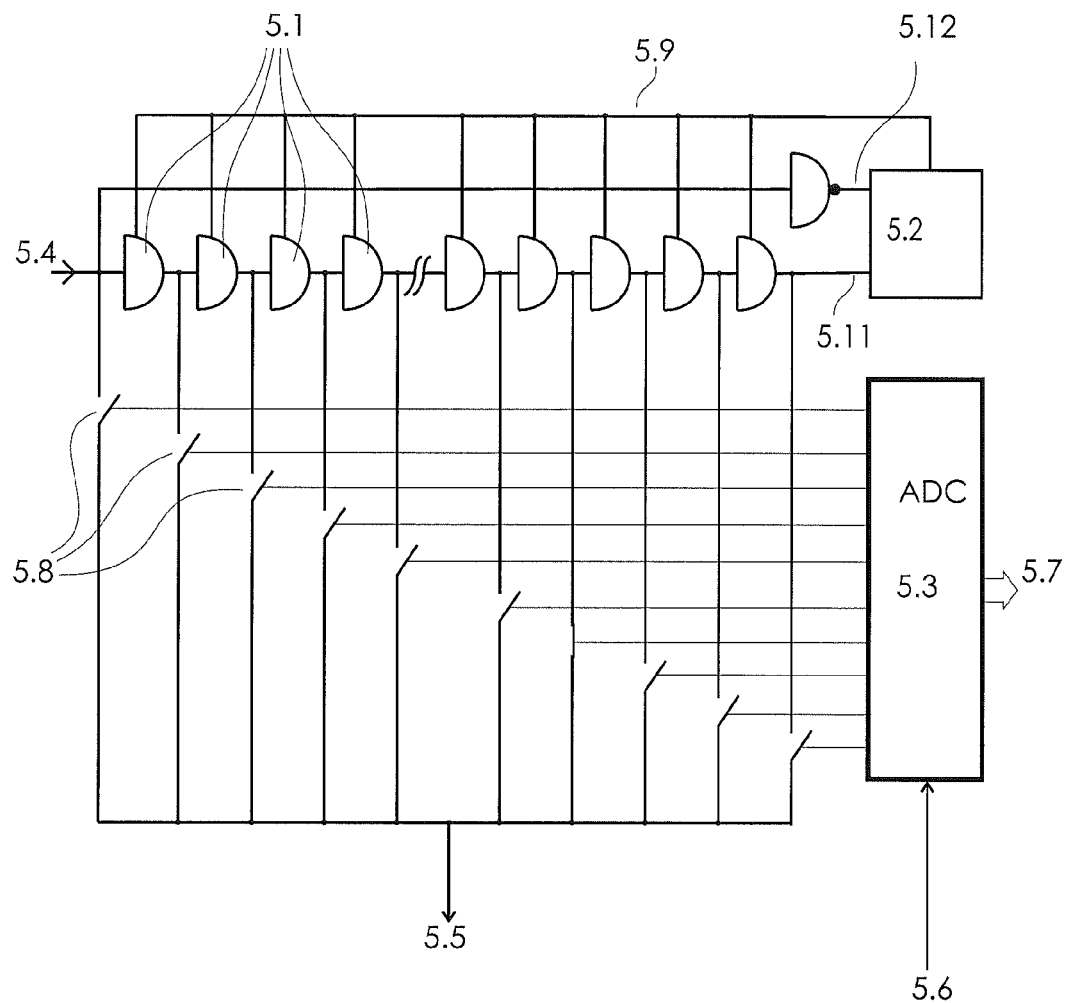
FIG. 5 is a schematic representation of a clock pulse shift in picosecond range.

To obtain a digital value for the light transit time, a digital signal delay can be used for this. A desired resolution of e.g. 1.5 mm then means a step size of 10 picoseconds. Corresponding to this, the clock rate of a possible microprocessor would then theoretically amount to 100 gigahertz: a clock frequency that is not yet possible at present. A solution to the clock pulse displacement in the picosecond range is shown in FIG. 5. A clock pulse 5.4 that can be taken from the clock pulse generator 1.1 with quartz crystal accuracy is passed through a specific number of gates 5.1 in an IC. Each of the gates passed through delays the clock pulse by a short time, e.g. 10 picoseconds. Any desired tapping between the gates can be selected by means of the switches 5.8. An analog/digital converter 5.3 receives the control voltage from the comparator 1.16. This selects a corresponding switch, depending on the control voltage. The binary value for the adjusted delay can then be picked up, for example, at output 5.7.

Figure 6:
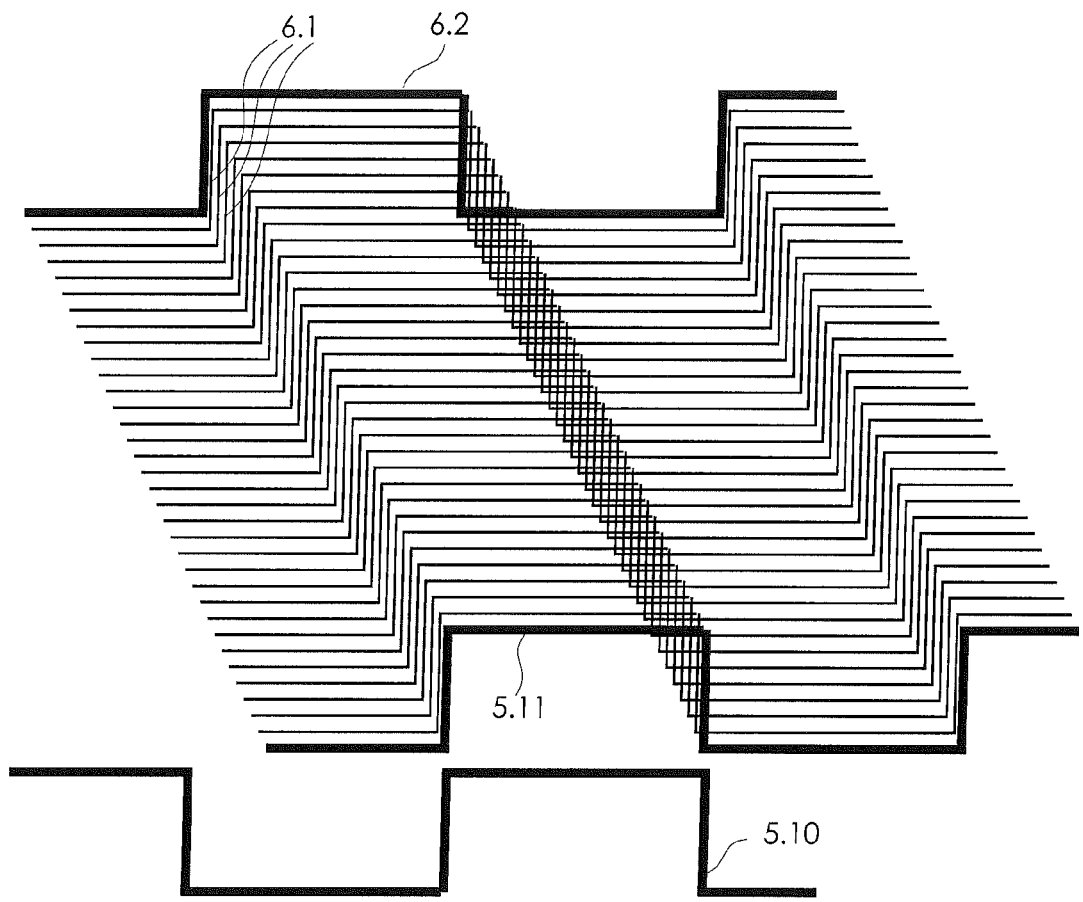
FIG. 6 are clock pulse curves in a configuration according to FIG. 5.

The delay time of a gate is dependent on temperature and supply voltage. To get around this problem, after passing through all the gates the clock pulse 5.11 is compared with an input clock pulse 5.4 in a phase comparator 5.2. With a corresponding number of gates, the clock pulse that has passed through all the gates and the input clock pulse 5.4 can then have the same phase. A phase difference is detected in the phase comparator 5.2 and emitted as control voltage gate transit time 5.9. This controls the delay time of the gates. In the simplest case, the control voltage of the gates is influenced to control the signal delay. One of the two input signals of the phase comparator 5.2 can also be inverted (5.10), in this case only half the gates are needed. This is illustrated in FIG. 6. After passage through all the gates, the original input clock pulse 6.2 is delayed by half a period and is thus again equal in phase with the inverted input signal 5.10. Therefore, a clock pulse delay in the picosecond range is possible with quartz crystal accuracy. To keep the number of switches 5.8 as low as possible, the gate transit time can be combined in blocks of e.g. 10 or 1 nanoseconds and 100 or 10 or 1 picoseconds. A direct binary control can also be achieved with a corresponding division of the gates.

The closed control loop comprising the photodiode 1.10, preamplifier 1.11, signal path switches 1.14 and 1.15, comparator 1.16, control voltage processing means 1.2, phase shift controls 1.3, 1.4 and 1.5 and light sources 1.8 and 1.9 independently assures a displacement of the reference or transmission phase by precisely the value of the light transit time in the path 1.24 and 1.25. Therefore, a simple determination of the light transit time and thus the distance to the reflecting object 1.26 is provided.

It is clearly understood that this description can be subject to a wide variety of modifications, changes and adaptations that fall within the area of equivalents to the attached claims.

The invention claimed is:

1. Method for determining a distance to a retroreflective object, the method including the following steps:
   transmitting a transmitted signal clocked by a clock control from at least one transmitting light source into at least one light path via an object to at least one receiver to detect a change in the transmitted signal from the object,
   receiving the transmitted signal from the light path by the at least one receiver as a first received signal and converting the first received signal into an electrical signal,
   transmitting at least one reference signal clocked by the clock control from at least one reference light source into at least one further light path to the at least one receiver,
   receiving the at least one reference signal from the at least one further light path by the at least one receiver as a second received signal and converting the second received signal into at least one electrical reference signal,
   evaluating the electrical signal and the at least one electrical reference signal in at least one comparator to determine a distance to the object,
   comparing one electrical signal integrated over at least a sub-section of the transmitted signal with the at least one electric reference signal, which is adjacent in time to the transmitted signal and integrated over at least one sub-section,
   generating a control value at an output of the at least one comparator to regulate the amplitude values of at least one of the transmitted signal and the at least one reference signal, wherein an amplitude of the electrical signal and an amplitude of the at least one electrical reference signal are equal in magnitude at least at the inputs of the at least one comparator when in a stabilized state,
   determining in the stabilized state an amplitude of a clock pulse change signal, occurring during a clock pulse change between at least one of the groups of the first electrical signal and the at least one electrical reference signal or the at least one electrical reference signal and the first electrical signal, the clock pulse change signal corresponding to a light transit time from the at least one transmitting light source to the object and to the at least one receiver,
   determining the amplitude of the clock pulse change signals in relation to one another or the amplitude of the clock pulse change signal compared to an amplitude independent of the light transit time as a difference value in a further comparator and eliminating or at least minimizing the difference value by means of a regulator, and
   wherein the at least one electrical reference signal at the input of the at least one comparator is formed by a mean value of the electrical reference signals of at least two reference signals in pulse form, of which one is emitted before and one is emitted after the transmitted signal in pulse form.

2. Method according to claim 1, wherein the amplitude value independent of this light transit time is an amplitude value at a preamplifier when the electrical signal and the at least one electrical reference signal at the inputs of the comparator are equal in magnitude.

3. Method according to claim 1, wherein the difference value is changed by means of the regulator to regulate the phase of the transmitted signal and the at least one reference signal until the difference value is minimal, wherein an adjusted change in the case of a minimal difference value corresponds to the light transit time.

4. Method according to claim 1, wherein if the electrical signal and the at least one electrical reference signal at the inputs of the comparator are equal in magnitude, only amplifier noise without clock synchronous alternating components from at least one the at least one transmitting light source and reference light source is present at the output of the at least one comparator.

5. Method according to claim 1, wherein to compensate different reaction times between the transmitting light source and the reference light source the sections, which contain no clock pulse change signal, are compared with further sections, which contain the clock pulse change signal, in an additional comparator, and wherein in the case of a difference at an output of the additional comparator at least one of the transmitted signal and an additional reference signal are lengthened or shortened until the difference is eliminated.

6. Method according claim 1, wherein for a digital signal delay a number of gates tappable by switches are provided, wherein a switch is selected in dependence on the difference value.

7. Method according to claim 6, wherein the clock control generates a clock pulse, and after passing through all the gates, which corresponds to a time of at least a half or a whole clock pulse period, a clock pulse is compared with an input clock pulse in a phase comparator to identify a phase difference, wherein any phase difference present regulates a delay time of the gates by means of a supply voltage of the gate.

8. Device for determining a distance to a retroreflective object, the device comprising:
   a clock control, at least one transmitting light source for transmitting a transmitted signal clocked by the clock control into at least one light path via an object to at least one receiver to determine a change in the transmitted signal;

at least one reference light source configured to transmit at least one reference signal clocked by the clock control into at least one further light path to the at least one receiver;

the at least one receiver configured to receive the transmitted signal and the at least one reference signal and for converting a received signal from the transmitted signal at the receiver into an electrical signal and a received signal from the at least one reference signal at the receiver into at least one electrical reference signal;

at least one comparator configured to compare the electrical signal and the at least one electrical reference signal to generate a comparative value at an output of the at least one comparator;

an evaluation unit configured to evaluate the comparative value to determine a distance to the object;

a control unit configured to control the clock control and signal path switches to integrate the electrical signal disposed over at least one sub-section of the transmitted signal and to integrate the at least one electrical reference signal, over at least one sub-section of the at least one electrical reference signal, said electrical reference signal being adjacent in time to the transmitted signal;

at least one regulator adapted to regulate the amplitude values of the at least one transmitted signal and the at least one electrical reference signal wherein an amplitude of the electrical signal and an amplitude of the at least one electrical reference signal are equal in magnitude at least at inputs of the at least one comparator;

means for detecting an amplitude of at least one clock pulse change signal in a stabilized state, wherein at least one clock pulse change signal occurs during a clock pulse change between at least one of the groups of the electrical signal and the at least one electrical reference signal or the electrical reference signal and the at least one electrical signal, the at least one clock pulse change signal corresponding to a light transit time from the transmitting light source to the object and to the receiver;

a second comparator configured to determine a difference value between the amplitudes of clock pulse change signals in relation to one another or the amplitude of the clock pulse change signal compared to an amplitude value independent of the light transit time;

a regulator configured to eliminate or at least minimize the difference value; and wherein a mean value former is provided to form a mean value of the at least one electrical reference signal resulting from at least two reference signals in pulse form at an input of the comparator, of which one reference signal is emitted before and another reference signal is emitted after the transmitted signal in pulse form.

9. Device according to claim 8, wherein the amplitude value independent of this light transit time is an amplitude value at a preamplifier when the electrical signal and the at least one electrical reference signal at the inputs of the comparator are equal in magnitude.

10. Device according to claim 8, wherein the regulator is provided to regulate a phase of the transmitted signal and the reference signal by influencing and minimizing the difference value, wherein the delay adjusted in the case of a minimal difference value corresponds to the light transit time.

11. Device according to claim 8, wherein an additional comparator is provided to compensate different reaction times between the transmitting light source and the at least one reference light source, which additional comparator compares sections, which contain no clock pulse change signal, with sections, which contain a clock pulse change signal, and wherein a regulator is provided, which lengthens or shortens at least one of the transmitted signal or the reference signal in the case of a difference at an output of the additional comparator until the difference is eliminated.

12. Device according to claim 8, wherein for a digital signal delay a number of gates tappable by means of switches are provided, wherein a switch is selected in dependence on the difference value.

13. Device according to claim 12, wherein a phase comparator is provided, which compares an input clock pulse of the clock control with a clock pulse, which is present after passing through all the gates and corresponds to a time of at least a half or a whole clock pulse period, to determine a phase difference, and wherein a regulator is provided, which if any phase difference is present regulates a delay time of the gates by means of a supply voltage of the gate.

14. Method for determining a distance to a retroreflective object, the method including the following steps:

transmitting a transmitted signal clocked by a clock control from at least one transmitting light source into at least one light path via an object to at least one receiver to detect a change in the transmitted signal from the object, receiving the transmitted signal from the at least one light path by the at least one receiver as a first received signal and converting the first received signal into an electrical signal, forwarding at least one electrical reference signal clocked by the clock control, evaluating the electrical signal and the at least one electrical reference signal in at least one comparator to determine a distance to the object, wherein the electrical signal integrated over at least a sub-section of the transmitted signal is compared with the at least one electric reference signal, which is adjacent in time to the transmitted signal and integrated over at least one sub-section of the transmitted signal, generating a control value at an output of the at least one comparator to regulate amplitude values of at least one of the transmitted signal and the at least one electrical reference signal, wherein an amplitude of the electrical signal and an amplitude of the at least one electrical reference signal are equal in magnitude at least at inputs of the at least one comparator when in a stabilized state, determining in the stabilized state an amplitude of a clock pulse change signal, occurring during a clock pulse change between at least one of the groups of the electrical signal and the at least one electrical reference signal or the at least one electrical reference signal and the electrical signal, the clock pulse change signal corresponds to a light transit time from the at least one transmitting light source to the object and to the at least one receiver, determining the amplitude of clock pulse change signals in relation to one another or the amplitude of the clock pulse change signal compared to an amplitude independent of the light transit time as difference value in a further comparator and eliminating or at least minimizing the difference value by means of a regulator, and wherein the at least one electrical reference signal at the input of the at least one comparator is formed by a mean value of electrical reference signals of at least two reference signals in pulse form, of which one is emitted before and one is emitted after the transmitted signal in pulse form.

15. Method according to claim 14, wherein the amplitude value independent of this light transit time is an amplitude value at a preamplifier when the electrical signal and the at least one electrical reference signal at the inputs of the at least one comparator are equal in magnitude.

16. Method according to claim 14, wherein the difference value is changed by means of the regulator to regulate the phase of the transmitted signal and the at least one reference signal until the difference value is minimal, wherein an adjusted change corresponds to the light transit time.

17. Method according to claim 14, wherein to compensate different reaction times, between the transmitting light source and reference source, sections, which contain no clock pulse change signal, are compared with further sections, which contain the clock pulse change signal, in an additional comparator, and wherein in the case of a difference at an output of the additional comparator at least one of the transmitted signal and the electrical reference signal forwarded are lengthened or shortened until the difference is eliminated.

18. Method according to claim 14, wherein for a digital signal delay a number of gates tappable by switches are provided, wherein a switch is selected in dependence on the difference value.

19. Method according to claim 18, wherein the clock control generates a clock pulse, and after passing through all the gates, which corresponds to a time of at least a half or a whole clock pulse period, the clock pulse is compared with the input clock pulse in a phase comparator to identify a phase difference, wherein any phase difference present regulates a delay time of the gates by means of a supply voltage of the gate.

20. Device for determining a distance to a retroreflective object, the device comprising:
a clock control,
at least one transmitting light source configured to transmit a transmitted signal clocked by the clock control into at least one light path via the object to at least one receiver to determine the change in the transmitted signal;
the at least one receiver configured to receive the transmitted signal and configured to convert the transmitted signal into an electrical signal;
a reference path configured to forward an electrical reference signal clocked by the clock control;
at least one comparator configured to compare the electrical signal and the at least one electrical reference signal to generate a comparative value at an output of the comparator;
an evaluation unit configured to evaluate the comparative value to determine a distance to the object;
a control unit configured to control the clock control and signal path switches to integrate the electrical signal disposed over at least one subsection of the transmitted signal and to integrate the at least one electrical reference signal, integrated over at least one sub-section of the electrical reference signal, said electrical reference signal being adjacent in time to the transmitted signal;
at least one regulator adapted to regulate amplitude values of at least one of the electrical signal and the at least one electrical reference signal so that an amplitude of the electrical signal and an amplitude of the at least one electrical reference signal are equal in magnitude at least at inputs of the at least one comparator;
means for detecting an amplitude of at least one clock pulse change signal in the stabilized state, wherein at least one clock pulse change signal occurs during a clock pulse change between at least one of the groups of the electrical signal and the at least one electrical reference signal or the at least one electrical reference signal and the electrical signal, the at least one clock pulse change signal corresponding to the light transit time from the transmitting light source to the object and to the receiver;
a second comparator configured to determine a difference value between the amplitudes of clock pulse change signals in relation to one another or the amplitude of the clock pulse change signal compared to an amplitude value independent of the light transit time;
a regulator configured to eliminate or at least minimizes the difference value; and
wherein a mean value form is provided to form a mean value of the at least one electrical reference signals resulting form at least two reference signals in pulse form at an input of the comparator, of which a one reference signal is emitted before and another reference signal is emitted after the transmitted signal in pulse form.

21. Device according to claim 20, wherein the amplitude value independent of this light transit time is an amplitude value at a preamplifier when the electrical signal and the at least one electrical reference signal at the inputs of the comparator are equal in magnitude.

22. Device according to claim 20, wherein the regulator is provided to regulate a phase of the transmitted signal and the reference signal by influencing and minimizing the difference value, wherein the delay adjusted in the case of a minimal difference value corresponds to the light transit time.

23. Device according to claim 20, wherein an additional comparator is provided to compensate different reaction times between the transmitting light source and at least one reference source, which additional comparator compares sections, which contain no clock pulse change signal, with sections, which contain a clock pulse change signal, and
wherein a regulator is provided, which lengthens or shortens at least one of the transmitted signal and the electrical reference signal forwarded, in the case of a difference at an output of the additional comparator until the difference is eliminated.

24. Device according claim 20, wherein for a digital signal delay a number of gates tappable by means of switches are provided, wherein a switch is selected in dependence on the difference value.

25. Device according to claim 24, wherein a phase comparator is provided, which compares an input clock pulse of the clock control with the clock pulse, which is present after passing through all the gates and corresponds to a time of at least a half or a whole clock pulse period, to determine a phase difference, and wherein a regulator is provided, which if any phase difference is present regulates the delay time of the gates by means of a supply voltage of the gate.

* * * * *